United States Patent [19]

Ushijima

[11] 4,083,442
[45] Apr. 11, 1978

[54] HYDRAULIC CONTROL SYSTEM FOR AUTOMATIC TRANSMISSIONS OF MOTOR VEHICLES

[75] Inventor: Fumihiro Ushijima, Toyota, Japan

[73] Assignee: Toyota Jidosha Kogyo Kabushiki Kaisha, Toyota, Japan

[21] Appl. No.: 593,497

[22] Filed: Jul. 7, 1975

[30] Foreign Application Priority Data

Oct. 22, 1974   Japan ................................ 49-121720

[51] Int. Cl.² ........................ F16D 25/00; F16D 43/20
[52] U.S. Cl. ............................... 192/54; 192/85 AA; 192/109 F; 192/56 F
[58] Field of Search ............ 192/56 F, 85 AA, 109 F, 192/54; 74/751

[56] References Cited

U.S. PATENT DOCUMENTS

| | | | |
|---|---|---|---|
| 2,642,971 | 6/1953 | Hagenbook | 192/56 F |
| 2,766,864 | 10/1956 | Schilling et al. | 192/85 AA |
| 3,482,669 | 12/1969 | Pegg | 192/85 AA |
| 3,675,512 | 7/1972 | Hirozawa | 192/56 F |
| 3,719,259 | 3/1973 | Burez et al. | 192/56 F |
| 3,900,089 | 8/1975 | Iveg | 192/85 AA |

Primary Examiner—Benjamin W. Wyche
Attorney, Agent, or Firm—Stevens, Davis, Miller & Mosher

[57] ABSTRACT

A hydraulic control system for automatic transmissions of motor vehicles without resorting to a one-way clutch wherein the fluid pressure to act on a piston member is controlled to effect a shift from a higher speed position to a lower speed position. The fluid pressure is controlled in accordance with the direction of rotation of multi-plate friction elements which are provided within the transmissions.

13 Claims, 13 Drawing Figures

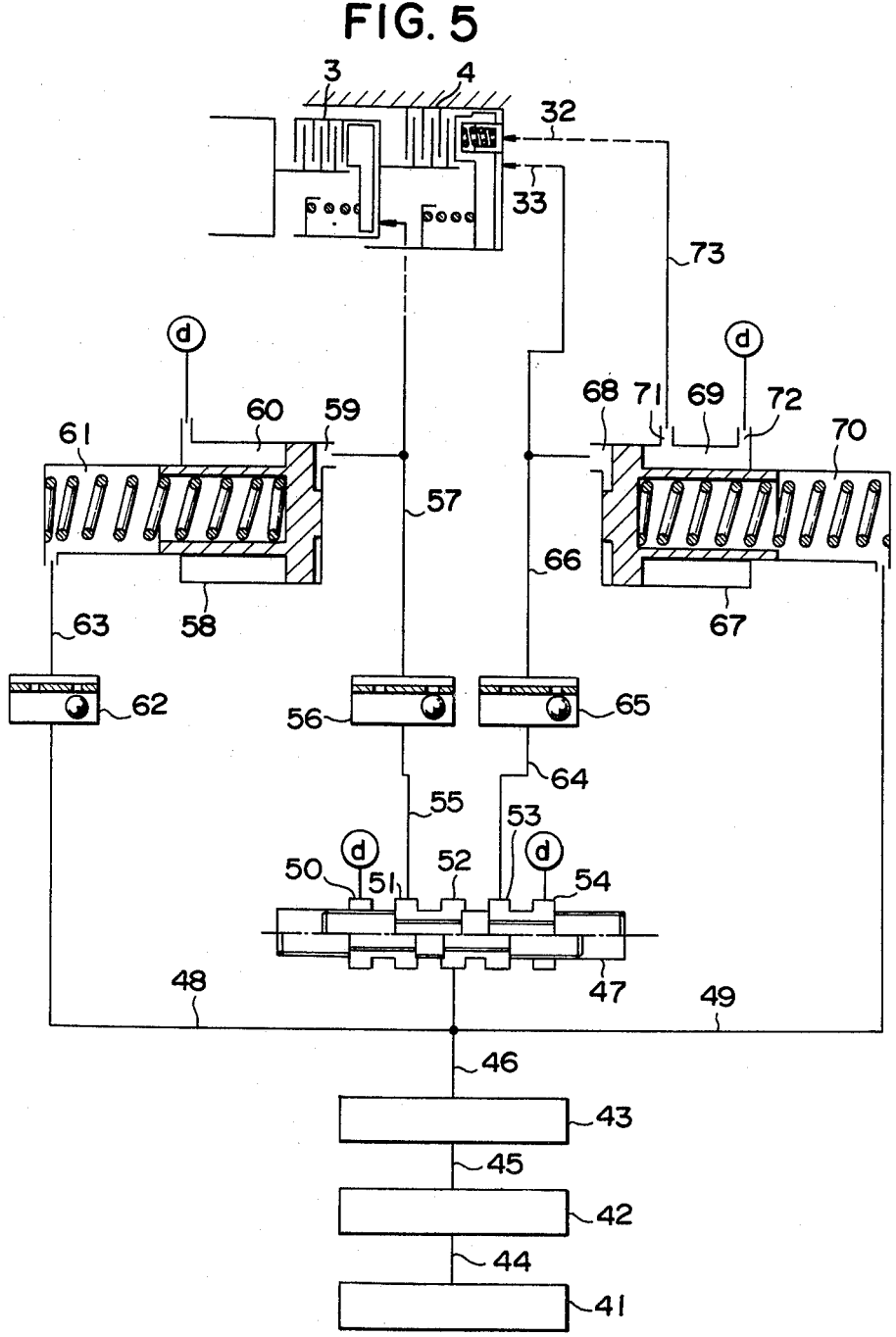

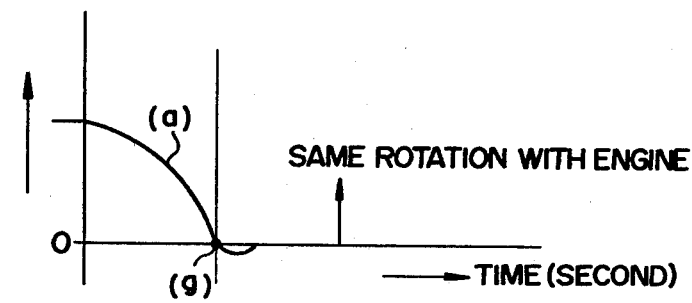
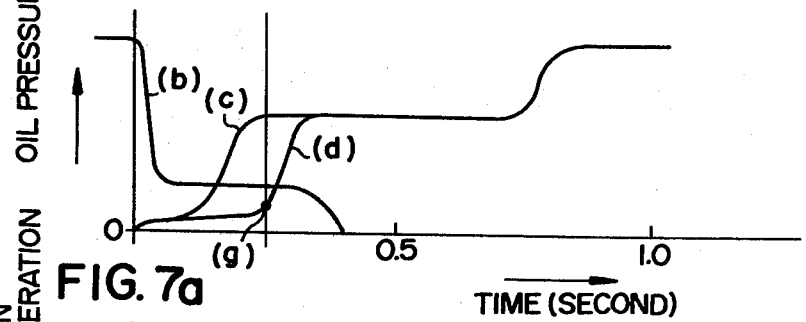
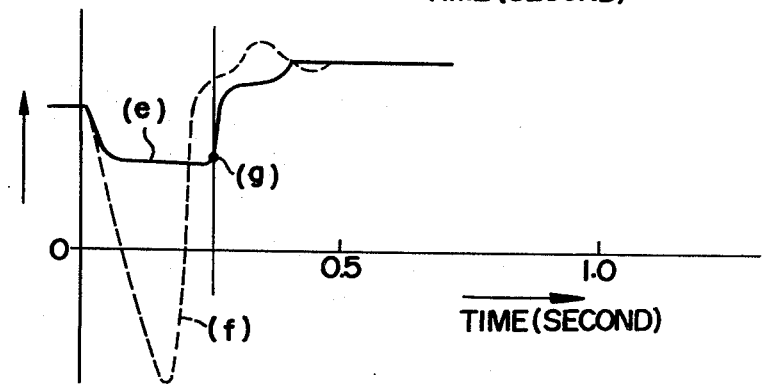

HYDRAULIC CONTROL SYSTEM FOR AUTOMATIC TRANSMISSIONS OF MOTOR VEHICLES

BACKGROUND OF THE INVENTION

1. Field of the Invention

This invention relates to a hydraulic control system for an automatic transmission of a motor vehicle, more particularly to a hydraulic control system for an automatic change-speed transmission of a motor vehicle.

2. Description of Prior Art

In the automatic transmissions of motor vehicles, a number of gear ratios are established generally by coupling and uncoupling a number of friction elements. During the shift operation from one gear ratio to another, the power from the engine is still flowing through the transmission so that it is very important to effect the switching from one frictional element to another with a proper timing. This is because improperly timed switching of the frictional element causes mechanical shocks or impacts at the time of coupling, places the engine in overrun conditions, deteriorates the maneuverability of the vehicle, or gives rise to troubles in the transmission per se.

In order to avoid the mechanical shocks which occur when shifting the transmission from one gear ratio to another, there has thus far been employed a method of using a frictional coupling element in combination with a one-way clutch. This method, however, is feasible only on such large-sized transmissions as will require a disadvantageously high production cost.

SUMMARY OF THE INVENTION

It is therefore an object of the present invention to provide a novel hydraulic control system for the automatic transmissions of motor vehicles, which is capable of precluding the shift shocks or impacts without involving the drawback of the afore-mentioned conventional method and without resorting to a one-way clutch, wherein the fluid pressure acting on a piston which operates the friction element is controlled to effect a smooth and shock-free shift of the transmission, particularly a smooth shift from a higher speed position to a lower speed position.

Briefly stated, according to the present invention, there is provided a hydraulic control system for an automatic change-speed transmission of a motor vehicle, which comprises a support member, mounting in a fixed position a multi-plate frictional element, a piston member slidingly movable in the axial direction of the shaft of the transmission for pressing said multi-plate friction element and slidingly rotatable in a certain degree about said shaft of the transmission, characterized in that said hydraulic control system comprises means for detecting the direction of rotation of said multi-plate friction element on said support member relative to another multi-plate friction element to be coupled therewith, and pressure control means for controlling fluid pressure to be supplied to said multi-plate friction coupling device in accordance with the detected direction of rotation of said multi-plate friction element, thereby to soothe the mechanical shocks which the friction element would receive when shifting said transmission.

In another aspect of the invention, the hydraulic control system of the automatic transmission comprises a support member mounting in a fixed position a multi-plate frictional element, a reaction plate loosely fit in said securing means and rotatable in a certain degree, means for detecting the direction of rotation of said multi-plate friction element on said support member relative to another multi-plate friction element to be coupled therewith, and means for controlling fluid pressure to be supplied to said multi-plate frictional coupling device in accordance with the detected direction of rotation of said multi-plate friction element, thereby to soothe the mechanical shocks which said friction elements would receive when shifting said transmission.

The invention will now be illustrated more particularly hereafter in conjunction with preferred embodiments shown in the accompanying drawings.

BRIEF DESCRIPTION OF THE DRAWINGS

FIG. 5 is a diagram of a hydraulic control circuit;

FIG. 7a is graph showing torque variations during the shift operation in relation with time duration;

FIG. 7b is a graph showing pressure variations in the piston chamber of the rear clutch during the shift operation in relation with the time duration;

FIG. 7c is a graph showing variation of the rotational speed of the rear clutch drum in relation with the time duration;

DETAILED DESCRIPTION OF THE PREFERRED EMBODIMENTS

Figure 1:
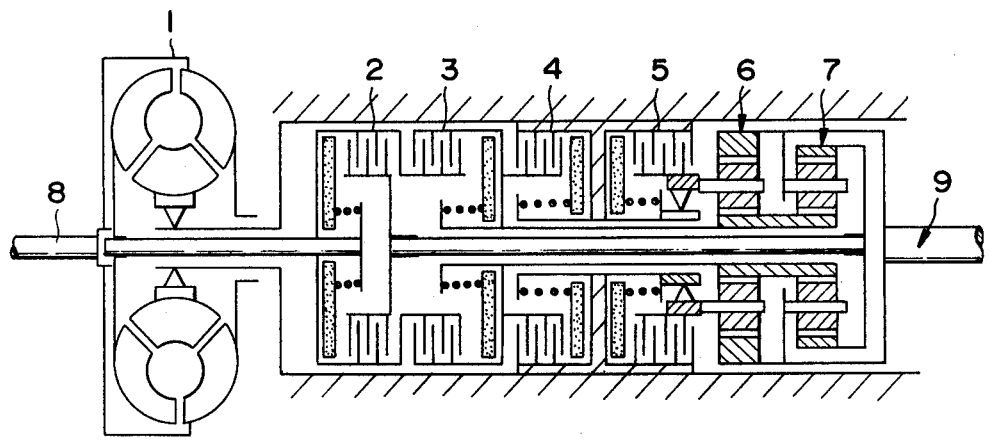
FIG. 1 is a diagrammatic view showing general construction of an automatic transmission.

FIG. 1 is a schematic view showing by way of example the general construction of an automatic transmission which employs the hydraulic control system according to the invention. Referring to FIG. 1, the power of an output shaft 8 of an engine is transmitted through a torque converter 1 to an input shaft of the transmission, which is then transmitted at changed speeds to an output shaft 9 of the transmission through planetary gear sets 6 and 7 by switching on and off in predetermined combinations a front clutch 2, rear clutch 3, front brake 4 and rear brake 5.

The respective gear ratios are established by engaging the friction elements in the following manner; In first, the front clutch 2 is in engagement and the front brake 4 is locked; In second, the front clutch 2 and the front brake 4 are in engaged; In third, the front clutch 2 and the rear clutch 3 are in engagement; and in reverse, the rear clutch 3 and the rear brake 5 are in engagement.

Figure 2:
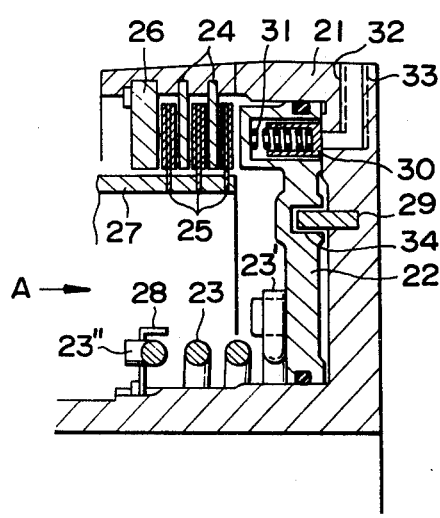
FIG. 2 is a sectional view showing an embodiment of the present invention.

FIG. 2 shows the invention as applied to the front brake 4. As shown, the front brake 4 includes a support member 21, a piston 22 which is located inwardly of and slidable along the inner wall surface of the support member 21, a spring member 23 which is connected to the support member 21 and the piston 22, frictional coupling plates 24 which are secured to the support member 21, lining plates 25 engageable with the friction plates 24, a reaction plate 26 which is secured to the support member 21, a hub 27 which securely mounts the lining plates 25, a spring retainer 28 which retains the spring 23 in position on the support member 21, a pin member 29 which is planted in the support member 21 for blocking rotation of the piston 22, a timing valve 30 which is provided within the piston 22, a valve spring 31 which presses the timing valve 30 toward the support member 21, a pin groove 34 which is formed in the piston 22 for accommodating the piston blocking pin 29, and a drain passage 32 and a fluid passage 33 which are formed through the support body 21 toward the aforementioned piston 22.

Figure 3A:
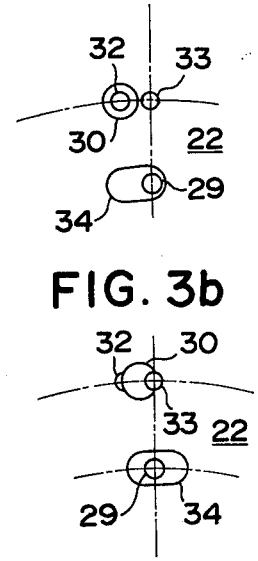
FIG. 3a is a diagrammatic view showing on an enlarged scale the operating fluid passages as seen in the direction of arrow A in FIG. 2.
Figure 3B:
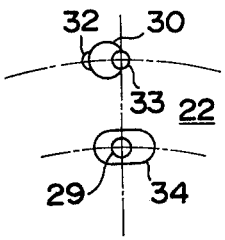
FIG. 3b is a view similar to FIG. 3a but showing related elements in shifted positions.

FIGS. 3a and 3b show on an enlarged scale the movement of the blocking pin member 29, drain passage 32 and fluid passage 33 of the support member 21, relative to the pin groove 34 and timing valve 30 of the piston 22, as seen in the direction of arrow A of FIG. 2.

Figure 4:
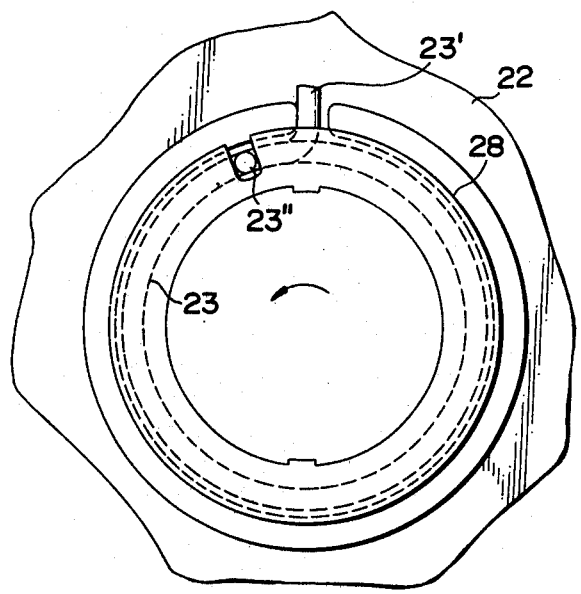
FIG. 4 is a diagrammatic view showing on an enlarged scale the spring portion as seen in the direction of arrow A in FIG. 2.

FIG. 4 shows on an enlarged scale the spring member 23 as seen in the direction of arrow A. The ends 23' and 23" of the spring member 23 are connected respectively to the piston 22 and the retainer 28, imparting a torque to the piston 22 in a direction opposite to the direction of rotation of the engine and at the same time serving to return the piston 22 toward the support member 21. When the piston 22 is in the returned position, the timing valve 30 blocks the drain passage 32 and opens the fluid passage 33 into the piston chamber under the influence of the torque of the spring member 23, as shown in FIG. 3a.

Figure 6:
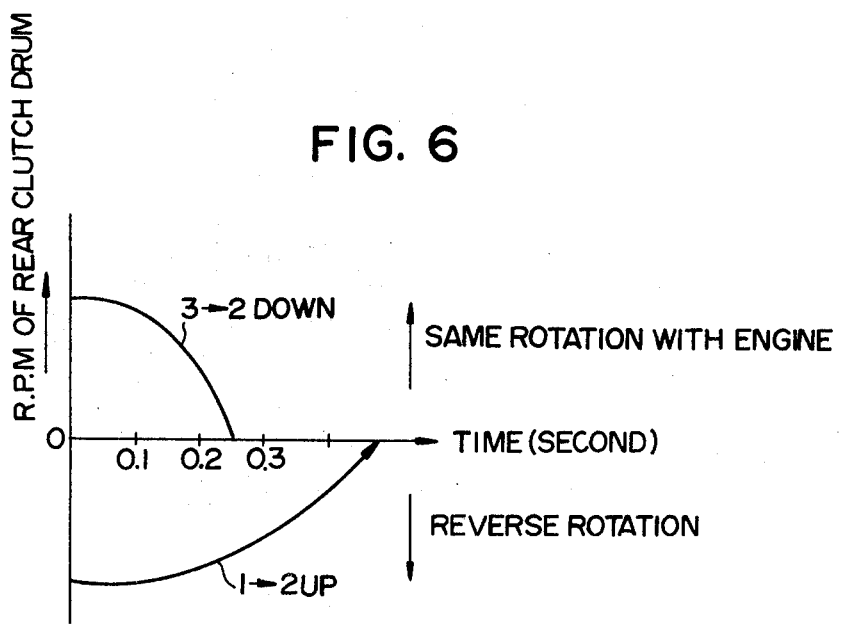
FIG. 6 is a graph showing variations in engine speed during the shift operation in relation with time duration.

FIG. 6 is a graph showing variations in the engine speed which occur when shifting the transmission. In this connection, the hub 27 is rotated in a direction reverse to the engine rotation in the first speed position, held stationary in second, and rotated in the forward direction in third.

FIG. 5 shows a hydraulic control circuit which is connected to the drain passage 32 and the fluid passage 33. Referring to FIG. 5, a fluid pressure source 41, a pressure regulator valve 42, a 1-2 shift valve 43 and a 2-3 shift valve 47 are connected in series by fluid passages 44 and 46. The 2-3 shift valve 47 is provided with ports 50 and 54, of which ports 50 and 54 are drained, port 52 is connected to the fluid passage 46, and port 51 is connected to the piston chamber of the rear clutch 3 through the fluid passage 55, ball valve 56 and fluid passage 57. The fluid passage 57 is connected to a first chamber 59 of an accumulator 58. The second chamber 60 of the accumulator 58 is drained and the third chamber 61 is connected to the fluid passage 46 through a fluid passage 63, ball valve 62 and fluid passage 48.

The hydraulic control circuit of FIG. 5 operates as follows. In the third speed, the fluid pressure in the passage 46 is fed to the passage 55 and 57 from the 2-3 shift valve 47 to engage the clutch 3. Under these circumstances, by switching the 2-3 shift valve 47 to the position for downshift to second, the passage 55 is drained and the fluid pressure is supplied to the passage 64. Therefore, the fluid pressure in the piston chamber of the rear clutch 3 is varied as shown by line (b) in FIG. 7b under the influence of the action of the accumulator 58 and at the same time the pressure in the fluid passage 66 is varied as shown by line (c) in the same figure. In this instance, the speed of the hub 27 becomes lower and lower, and the piston 22 is moved into frictional contact with the lining plate 25 while maintaining the position shown in FIG. 3a. By the torque produced as a result of this frictional contact with the lining plate 25, the piston 22 overcomes the torque of the spring 23 and rotates in the same direction as the engine rotation to assume the balanced position shown in FIG. 3b. This is because the passage 32 is drained by the accumulator 67 and the fluid passage 33 is constricted by the timing valve 30 to hold under low pressure the piston 22 in the balanced position contacting the lining plate 25. As the hub 27 is further slowed down and stopped to start rotation in the reverse direction, the piston 22 is returned to the position of FIG. 3a by the frictional torque and the action of the spring, the fluid pressure in the piston being suddenly increased from point (g) as shown by line (d) in FIG. 7b to complete the shift operation. Thus, the shift is effected smoothly and most reliably, without causing overrunning to the engine nor unpleasant mechanical shocks. The torque variation at the time of the gearshift is reduced to a remarkable degree as shown by line (e) in FIG. 7a, as compared with the torque variation of the conventional transmission indicated by line (f) in the same figure. This contributes to improve the durability of the respective operating parts.

At the time of downshift from third to second with the engine acting as a brake, the hub 27 tends to rotate at a higher speed due to the negative torque of the engine and prevents the piston 22 from failing to engage by retaining the position of FIG. 3b, the fluid passage 32 receiving the fluid pressure from the fluid passage 73 as soon as the accumulator is moved to a certain degree to complete the engagement.

Figure 8:
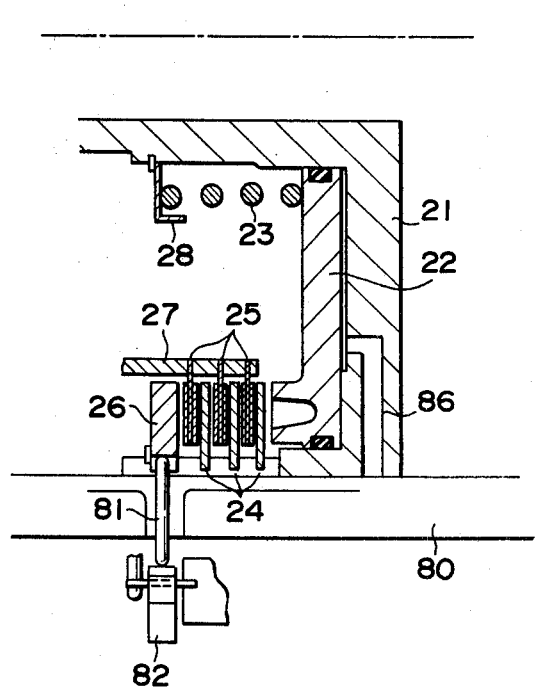
FIG. 8 is a diagrammatic section view showing another embodiment of the present invention.
Figure 9:
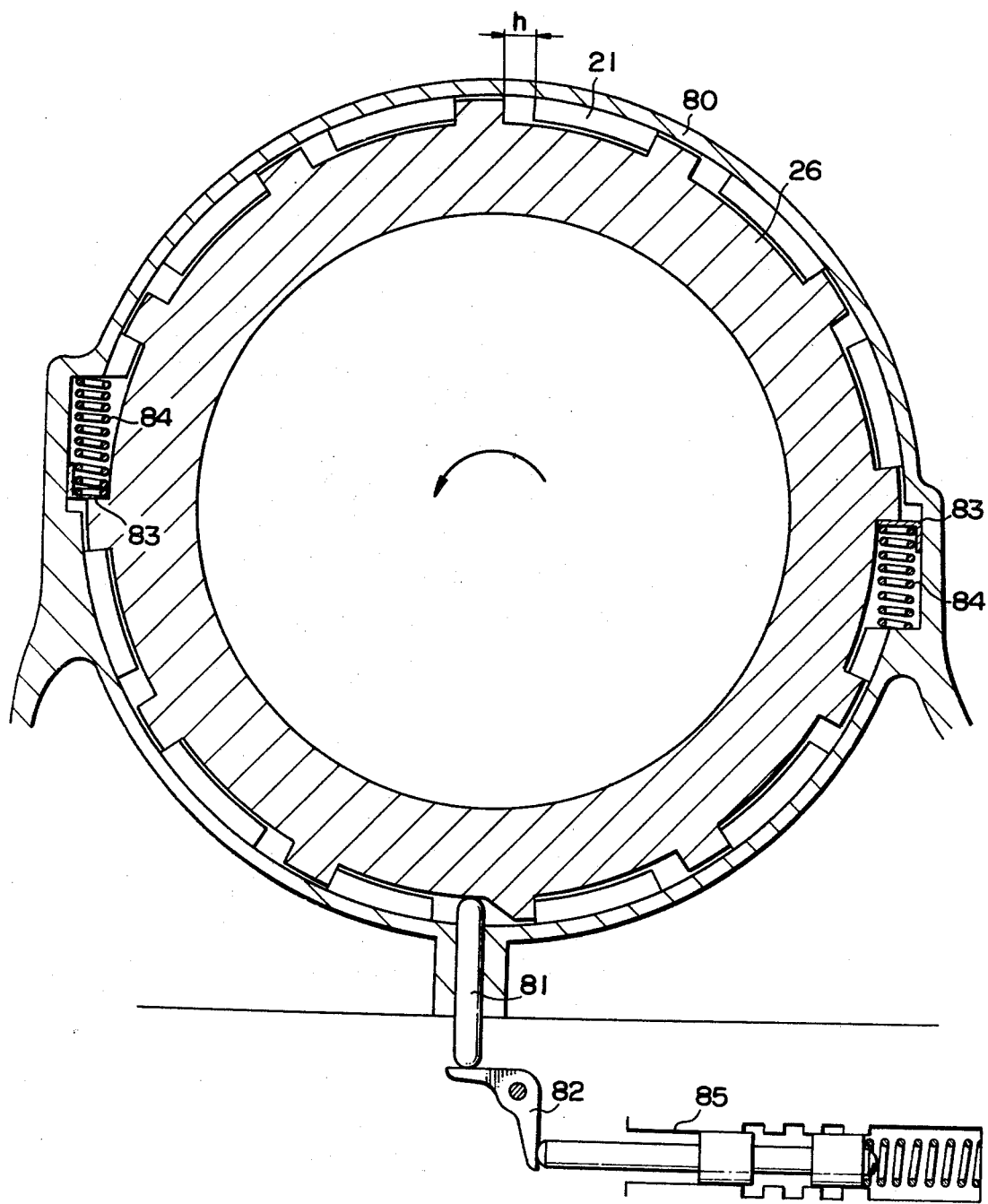
FIG. 9 is a diagrammatic front view of the same embodiment.
Figure 10:
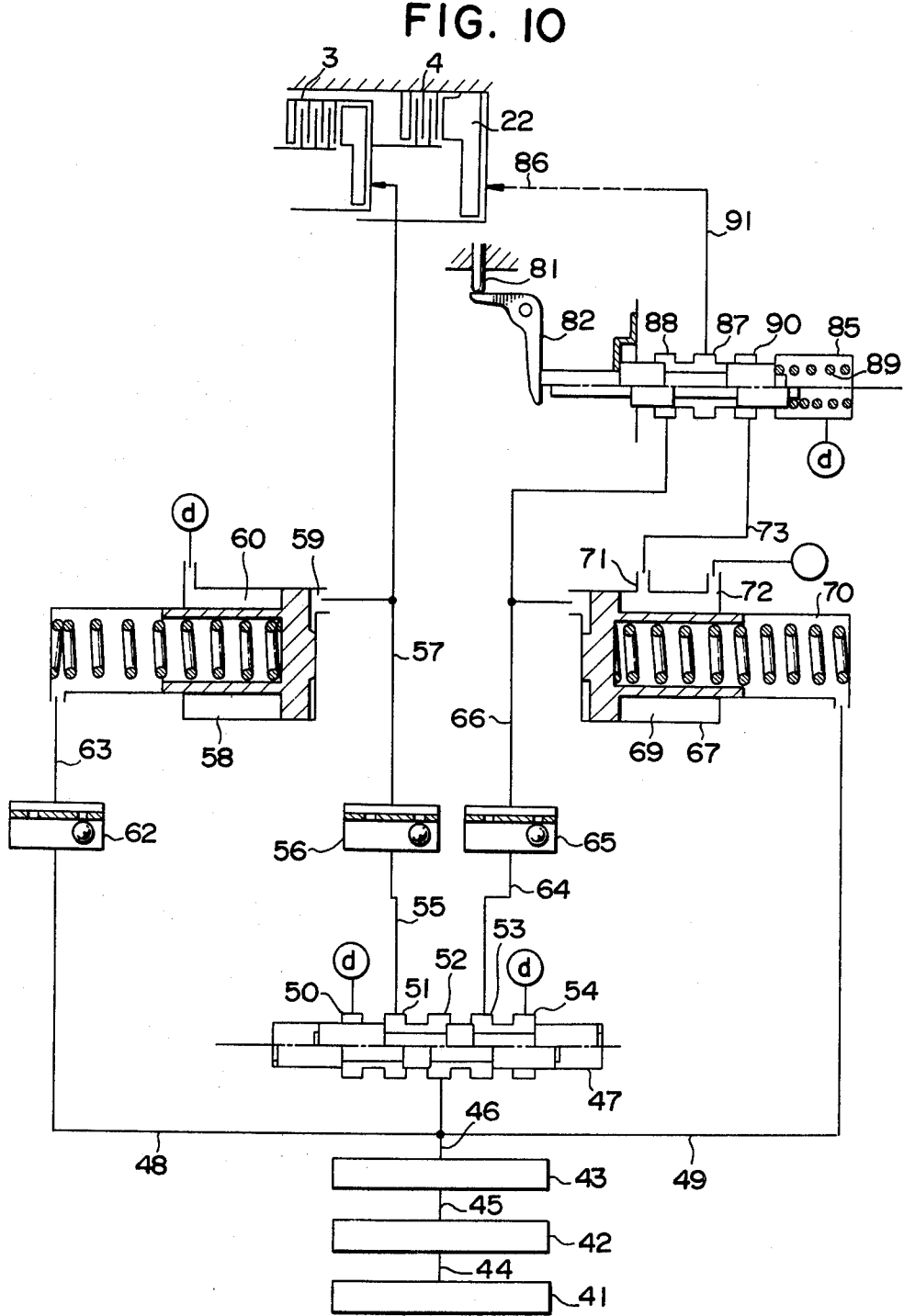
FIG. 10 is a diagram of a hydraulic control circuit.

FIGS. 8 to 10 show another embodiment of the present invention. This embodiment (hereinafter referred to simply as "second embodiment") is different from the preceding embodiment in that the fluid pressure is controlled by the movement of a reaction plate 26 as shown particularly in FIGS. 8 and 9, instead of the movement of the piston 22. In this instance, the front brake 4 is provided with a support member 21, piston 22, spring 23, spring retainer 28, hub 27, friction plates 24, lining plates 25, reaction plate 26 and oil passage 86. The reaction plate 26 is, as shown in FIG. 9, held in position and imparted with a torque in the direction of the arrow by springs 84 which are retained in spring retainers 83. The splined portions of the reaction plate 26 are supported by the support member 21 with a clearance of a width (h) therefrom. One end of a rod member 81 is disposed at the side of one of the splined portions of the reaction plate 26 for transmitting the movement of the reaction plate 26 to a timing valve 85 through a crank lever 82.

FIG. 10 shows a hydraulic control circuit including the timing valve 85, which is same as the control circuit of FIG. 5 except for the construction of the timing valve 85. Similar component parts are designated by similar reference numerals without further explanations to avoid repetition. The timing valve 85 is provided with ports 87, 88 and 90, and one of the drained ends of the valve 85 is loaded with a spring 89 and the other end is held in contact with the crank lever 82. The port 88 is connected to the passage 66. The port 87 is connected to the passage 86 of the front brake 4 through passage 91, while the port is in fluid communication with port 71 of the accumulator 67.

On a downshift from third to second, the rear clutch 3 is drained by the 2-3 shift valve 47 and the fluid pressure is supplied to the passages 64 and 66. Further, the fluid pressure is supplied to the passages 91 and 86 from the timing valve 85, so that the piston 22 is moved and begins to press the friction plates 24 against the lining plates 25. As a result, the reaction plate 26 is frictionally drawn and rotated by the lining plate 25 to depress the rod 81, whereupon the timing valve 85 constricts the passage 66 and opens the passage 73 which is drained to the accumulator 67, holding the operating fluid in the servopiston of the front brake at a lowly pressurized level. As soon as the lining plates 25 are held stationary and start reverse rotation, the reaction plate 26 is returned to the position of FIG. 9 under the influence of the frictional torque and the action of the spring 84. As a result, the passage 66 is fully opened and the fluid pressure in the servopiston of the front brake 4 is increased abruptly to complete the shift operation. At the time of a 3-2 downshift where the engine acts as a brake, fluid pressure is supplied to the passage 73 by the movement of the accumulator 67 to apply the front brake 4 in an assured manner, as mentioned hereinbefore.

It will be understood from the foregoing description that, according to the present invention, it becomes possible to soothe the shocks or impacts which are usually produced when shifting an automatic transmission in an advantageously easy and reliable manner, particularly at the time of a downshift from a higher to a lower speed position, by controlling the fluid pressure acting on the piston and without employing the frictional coupling element in combination with a one-way clutch.

It will be understood that the above description is merely illustrative of preferred embodiments of the invention.

I claim:

1. A hydraulic control system for an automatic transmission having a housing and a shaft therein, said system comprising, in combination:
    (a) a cylinder member engaged with the housing of the transmission and having a pair of fluid passages defined therethrough;
    (b) a piston member mounted in said cylinder member and having a valve for controlling the opening and closing of one of said fluid passages, said piston member being movable within a predetermined angular limit about said shaft, means for blocking the angular movement of said piston member about the shaft of said transmission;
    (c) a spring retainer rigidly secured to said cylinder member;
    (d) a spring between said spring retainer and said piston member and engaged with said piston member for applying a reaction force thereto in the axial direction as well as in the circumferential direction of the shaft of the transmission;
    (e) a fluid pressure chamber defined by said cylinder member and said piston member, said chamber being connected with said fluid passages;
    (f) a reaction member rigidly secured to said cylinder member;
    (g) a first friction element between said reaction member and said piston member and slidably engaged in the axial direction of said transmission with said cylinder member; and
    (h) a second friction element adapted to engage said first friction element and engaged with a friction element carrying member connected to said shaft, said piston member detecting the direction of rotation of the friction element carrying member relative to the cylindrical member when said first and second friction members are engaged with each other to thereby control the fluid pressure to be supplied to said fluid chamber.

2. The control system as claimed in claim 1, wherein said piston member has at least two holes defined therein which open into said fluid chamber.

3. The control system as claimed in claim 2, wherein said valve is held in one of the holes in said piston member by the force of a spring and is held in contact with the inner wall of said cylinder member.

4. The control system as claimed in claim 3, wherein said valve and the pair of fluid passages of said cylinder member are located on the same radius from the center of the shaft of said transmission, said fluid passages being opened or closed by the rotation of said piston member to thereby control the fluid pressure to be supplied to said fluid chamber.

5. The control system as claimed in claim 4, wherein said cylinder member comprises a pin member rigidly secured thereto so as to block the rotation of said piston member in the circumferential direction of the shaft of said transmission.

6. The control system as claimed in claim 5, wherein said pin member is positioned in the other one of said holes in said piston member for blocking the rotation of said piston member.

7. The control system as defined in claim 1, wherein said piston member comprises an annular projection on the side thereof which faces said spring, said annular projection having a notch defined therein, and said spring retainer has a notch defined therein.

8. The control system as claimed in claim 7, wherein a line connecting said notches is not parallel to the axis of said transmission, one end of said spring being in one of said notches and the other end of said spring being in the other one of said notches whereby said spring applies a reaction torque to said piston member in the circumferential direction of the shaft of said transmission.

9. The control system as claimed in claim 8, wherein said reaction torque is adapted to be applied to said piston member in a direction opposite to the direction of rotation of an engine.

10. The control system as defined in claim 1, wherein said piston member has a hole defined therein which opens into said fluid pressure chamber, and a projection for blocking the rotation of said piston member.

11. The control system as defined in claim 10, wherein said cylinder member has a hole defined therein for accommodating said projection for blocking the rotation of said piston member.

12. A hydraulic control system for an automatic transmission having a housing, said system comprising, in combination:
    (a) a cylinder member engaged with the housing of the transmission and having a pair of fluid passages defined therethrough;
    (b) a piston member mounted in said cylinder member and having a valve;
    (c) a fluid pressure chamber defined by said cylinder member and piston member;
    (d) a fluid pressure source;

(e) a shift means for selectively supplying fluid pressure to said fluid pressure chamber from said fluid pressure source;
(f) an accumulator between said shift means and said cylinder member;
(g) one of said pair of fluid passages communicating with said shift means; and
(h) the other one of said pair of fluid passages communicating with said accumulator.

13. A hydraulic control system for an automatic transmission having a housing and a shaft therein, said system comprising:
a cylinder member engaged with the housing of the transmission and having a fluid feed passage and a fluid drain passage defined therethrough;
a source of fluid pressure connected to said fluid feed passage;
an accumulator connected to said fluid drain passage;
a piston member in said cylinder member, said piston member having a valve for controlling opening and closing of said passages;
a spring between said cylinder member and said piston member for applying a reaction force to said piston member axially and circumferentially of the shaft of the transmission, said spring normally circumferentially biassing said piston member into a position in which said valve closes said drain passage and opens said feed passage;
a fluid pressure chamber defined by said cylinder member and said piston member;
a reaction member rigidly secured to said cylinder member;
rotatable hub;
a first friction element connected to said cylinder member, said first friction element being between said reaction member and said piston member;
a second friction element connected to said hub, said second friction element being adapted to engage said first friction element; and
said piston member upon axial movement thereof being adapted to engage said second friction element whereby when said transmission is shifted said piston member is axially moved into engagement with said second friction element and is rotated in a direction opposite to the bias of said spring to a balanced position in which said valve partially opens and closes both said feed passage and said drain passage.

* * * * *